(No Model.)
F. C. SCHLEICHERT.
MEAT HOLDER.
No. 499,804. Patented June 20, 1893.
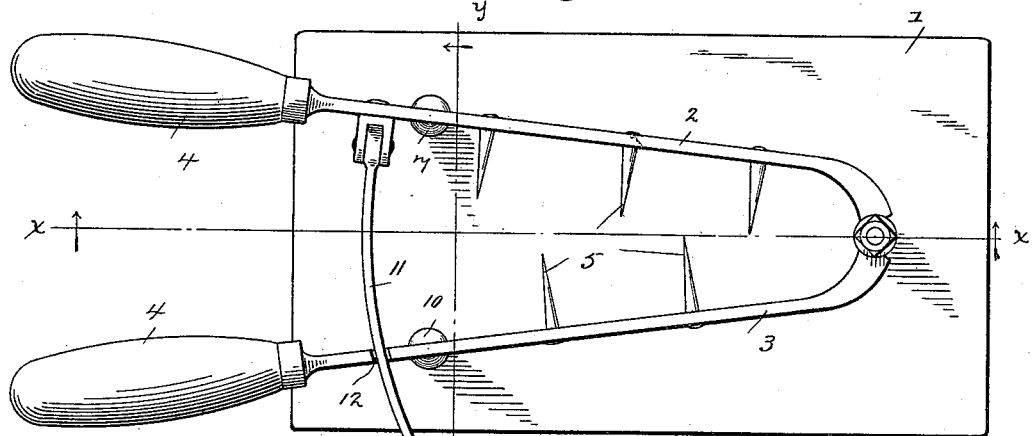
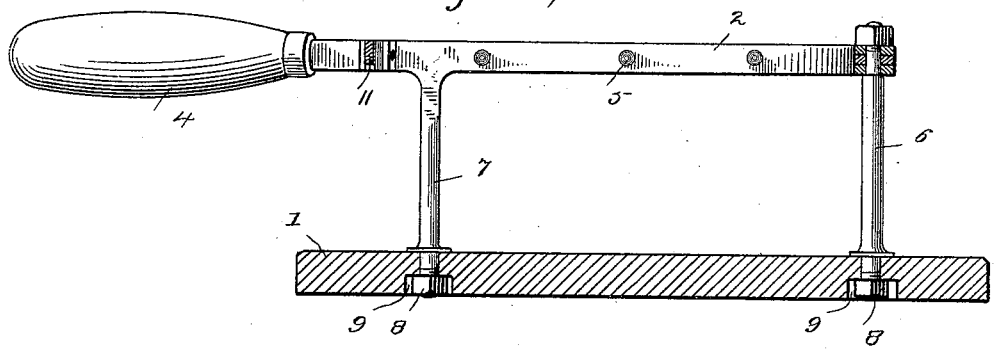
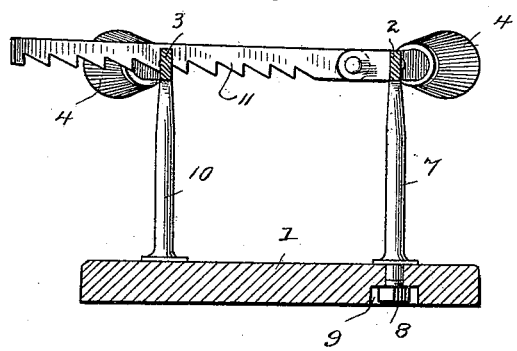
WITNESSES
H. A. Lamb
Pearl Reynolds
INVENTOR
Frank C. Schleichert
By H. M. Wooster
Atty.

UNITED STATES PATENT OFFICE.

FRANK C. SCHLEICHERT, OF BRIDGEPORT, CONNECTICUT.

MEAT-HOLDER.

SPECIFICATION forming part of Letters Patent No. 499,804, dated June 20, 1893.

Application filed March 28, 1893. Serial No. 467,966. (No model.)

*To all whom it may concern:*

Be it known that I, FRANK C. SCHLEICHERT, a citizen of the United States, residing at Bridgeport, in the county of Fairfield and State of Connecticut, have invented certain new and useful Improvements in Meat-Holders; and I do hereby declare the following to be a full, clear, and exact description of the invention, such as will enable others skilled in the art to which it appertains to make and use the same.

My invention has for its object to produce a device adapted for general use but more especially adapted for use in butcher's shops, to hold a piece of meat while slicing it. This device is adapted to hold all kinds of meat requiring to be sliced or shaved, as for example hams or pieces of dried beef, but will be found especially adapted to hold large pieces of corned beef and various kinds of meat that are boiled in large pieces and sliced off in quantities to suit retail customers.

In order to provide a practical and useful device for this purpose I have devised the novel meat holder which I will now describe referring by numbers to the accompanying drawings forming part of this specification in which—

Figure 1 is a plan view of my novel meat holder; Fig. 2 a section on the line $x\ x$ in Fig. 1, and Fig. 3 is a section on the line $y\ y$ in Fig. 1.

1 denotes the base which may be made of metal or wood but is preferably a piece of marble.

The operative parts of the device consist of a fixed arm 2 and a movable arm 3 each of which is provided with handles 4 for convenience in operation, and with prongs 5 which are forced into the meat. The forward ends of the two arms are both connected to a standard 6 which extends upward from the base. The rear end of the fixed arm is rigidly supported by a standard 7 which extends into or through the base. I preferably provide a thread at the lower end of this standard and lock the parts in place by means of a nut 8 lying in a recess 9 in the under side of the base. Movable arm 3 may either be pivoted to standard 6 or rigidly secured thereto so that the standard itself will turn in the base. The lower end of this standard is also preferably threaded and is engaged by a nut 8 lying in a recess 9. The rear end of the movable arm is supported by a rest 10 which is adapted to move over the top of the base when the arm is swung in or out by means of the handle. 11 is a rack pivoted to one of the arms, the fixed arm as shown in the drawings, and adapted to engage the movable arm to hold the latter in position after it has been moved inward to clamp a piece of meat. I preferably provide a notch 12 in the top of arm 3 in which the rack lies, the sides of the notch acting to hold the rack against lateral movement on the arm.

The operation will be clearly understood from the drawings in connection with the description. To place a piece of meat in position to be sliced, the operator throws the rack backward out of the way, places a piece of meat between the arms, then swings the movable arm inward toward the fixed arm until the piece of meat is firmly clamped between the two arms, the prongs being forced into it so that it is held securely. The operator then locks the movable arm in the holding position by means of the rack. It will of course be obvious that the piece of meat can be placed and held in any position most convenient for slicing.

Having thus described my invention, I claim—

1. A meat holder consisting of a suitable base, a fixed arm, a movable arm, suitable standards and a rest by which the arms are supported, and a rack pivoted to one arm and engaging the other arm by which the movable arm is retained in the holding position.

2. A meat holder consisting of a base, a fixed arm, standards 6 and 7 rigidly secured in the base by which the fixed arm is supported, a movable arm the forward end of which is pivoted to standard 6 the rear end being supported by a rest 10, and a rack pivoted to one of the arms and engaging the other arm to retain the movable arm in the holding position.

3. A meat holder consisting of a base, a fixed arm and a movable arm both of which are provided with inwardly extending prongs and handles 4 for convenience in operation, suitable standards and a rest by which the arms are supported and a rack pivoted to one arm and engaging the back of the other arm by which the movable arm is retained in the holding position.

In testimony whereof I affix my signature in presence of two witnesses.

FRANK C. SCHLEICHERT.

Witnesses:
A. M. WOOSTER,
PEARL REYNOLDS.